United States Patent [19]

Osborne et al.

[11] 4,225,976

[45] Sep. 30, 1980

[54] PRE-CALIBRATION OF GAIN CONTROL CIRCUIT IN SPREAD-SPECTRUM DEMODULATOR

[75] Inventors: William P. Osborne, Melbourne; William F. Hartman, Palm Bay; Luther L. Crabtree, Melbourne, all of Fla.

[73] Assignee: Harris Corporation, Cleveland, Ohio

[21] Appl. No.: 882,015

[22] Filed: Feb. 28, 1978

[51] Int. Cl.$^2$ ............................................. H04B 17/00
[52] U.S. Cl. ..................................... 455/226; 455/246; 330/2
[58] Field of Search .................. 325/67, 363, 398, 400, 325/404, 408, 409, 411, 407; 324/57 N; 343/17.7; 330/2, 145, 144

[56] References Cited

U.S. PATENT DOCUMENTS

| | | | |
|---|---|---|---|
| 2,620,438 | 12/1952 | Cotsworth | 324/57 N |
| 3,196,355 | 7/1965 | Berry et al. | 325/407 |
| 3,331,030 | 7/1967 | Jordan, Jr. et al. | 325/407 |
| 3,351,853 | 11/1967 | Wood | 325/67 |
| 3,506,915 | 4/1970 | Harris et al. | 325/363 |
| 3,774,113 | 11/1973 | Chasek | 325/363 |
| 3,835,378 | 9/1974 | Edden et al. | 325/363 |
| 4,074,201 | 2/1978 | Lennon | 325/363 |

*Primary Examiner*—Robert L. Griffin
*Assistant Examiner*—Jin F. Ng
*Attorney, Agent, or Firm*—Craig & Antonelli

[57] ABSTRACT

In a spread-spectrum receiver, a predetermined noise floor voltage, supplied together with the output of the correlation detector as a control voltage for an AGC amplifier, is subjected to a pre-signal reception adjustment or calibration, in order to compensate for drift in the noise floor or reference voltage and to correct for gain errors in the correlation detector channel thereby insuring proper operation of the detector during the sequential detection process. For this purpose, a prescribed random signal sequence, totally different from that contained in any useful transmission to be acquired, is initially applied to the correlation detector for a predetermined period of time or calibration interval. The output of the correlation detector is sampled and stored, successive samples are compared with the predetermined or fixed reference noise floor voltage, and successive adjusted noise floor reference values are produced, representative of differences between the noise level in successive correlation samples and the predetermined noise reference. These adjusted reference values are accumulated and this accumulated noise floor is fed back to the AGC amplifier as the noise floor control reference. At the end of the calibration interval, the receiver is switched to a normal operating mode and control of the AGC amplifier is determined by the noise floor reference level which has been adjusted or calibrated to the voltage represented by the accumulated noise floor level at the end of the calibration interval. Preferably, the calibration circuitry is implemented in digital form, with the duration of the calibration interval being controlled by a digital counter which counts clock pulses up to a prescribed number and then prevents further accumulations of noise reference values. The output of the counter may also be coupled as a control signal to cause a spread-spectrum signal acquisition PN sequence to be substituted for the random noise sequence which had been applied to the correlation detector during the calibration mode.

22 Claims, 1 Drawing Figure

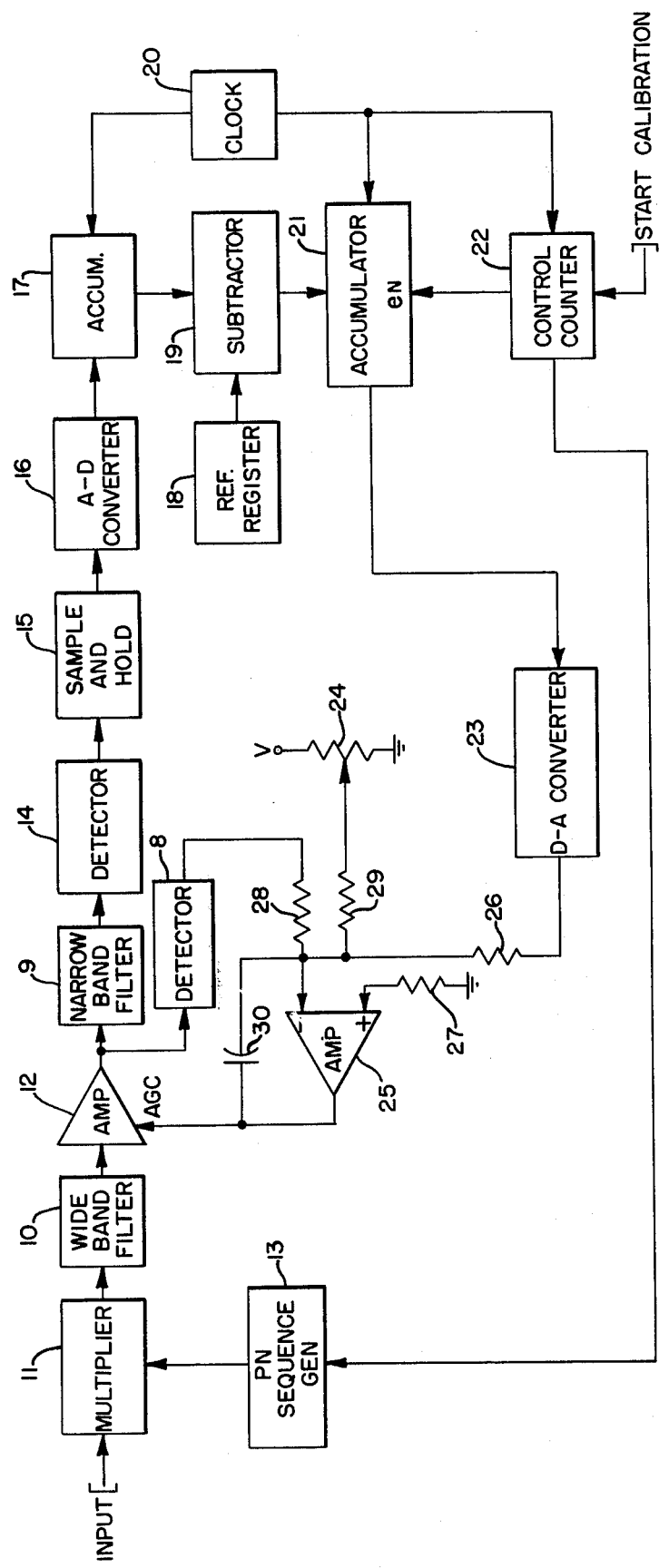

PRE-CALIBRATION OF GAIN CONTROL CIRCUIT IN SPREAD-SPECTRUM DEMODULATOR

The United States Government has rights in this invention pursuant to contract no. DAAB 0775-C0040 awarded by the Department of the Army.

FIELD OF THE INVENTION

The present invention relates to communication systems and is particularly directed to a technique for pre-calibrating a gain control circuit employed in a spread-spectrum demodulator.

BACKGROUND OF THE INVENTION

In a spread-spectrum communication system, wherein transmitted signal power is spread over a transmission bandwidth many times greater than the information bandwidth, bandwidth is sacrificed in an effort to achieve jam resistance, reduce the probability of detection, and to provide multipath signal rejection.

To maximize the performance, i.e. jam resistance, the signal-to-noise ratio for an acquired signal may be very small (on the order of several dB) and it is of paramount importance that the noise floor of the correlation detector by which a spread-spectrum signal is acquired be controlled so that it (i.e. the noise floor) does not change as a function of the input signal-to-noise ratio of the detector. For this purpose, an automatic gain control (AGC) amplifier may be inserted in the correlation detection signal path, with the control voltage for the AGC amplifier being derived from the output of the detector.

SUMMARY OF THE INVENTION

In accordance with the present invention, a predetermined noise floor voltage, supplied together with the output of the correlation detector as a control voltage for the AGC amplifier, is subjected to a pre-signal reception adjustment or calibration, in order to compensate for drift in the noise floor or reference voltage and to correct for gain errors in the correlation detector channel thereby insuring proper operation of the detector during the sequential detection process. For this purpose, a prescribed random signal sequence, totally different from that contained in any useful transmission to be acquired, is initially applied to the correlation detector for a predetermined period of time or calibration interval. Through the use of such a random noise sequence, the output of the correlation multiplier is such that the system appears to be monitoring white noise, thereby guaranteeing that adjustment of the noise floor level of the correlation detector will be premised upon a true noise signal. The output of the correlation detector is sampled and stored, successive samples are compared with the predetermined or fixed reference noise floor voltage, and successive adjusted noise floor reference values are produced, representative of differences between the noise level in successive correlation samples and the predetermined noise reference. These adjusted reference values are accumulated and this accumulated noise floor is fed back to the AGC amplifier as the noise floor control reference. At the end of the calibration interval, the prescribed random signal sequence which produced the white noise is terminated and further accumulation for the noise floor reference is prevented. The receiver is switched to a normal operating mode and control of the AGC amplifier is determined by the noise floor reference level which has been adjusted or calibrated to the voltage represented by the accumulated noise floor level at the end of the calibration interval. Preferably, the calibration circuitry is implemented in digital form, with the duration of the cablibration interval being controlled by a digital counter which counts clock pulses up to a prescribed number and then prevents further accumulation of noise reference values. The output of the counter may also be coupled as a control signal to cause a spread-spectrum signal acquisition PN sequence to be substituted for the random noise sequence which had been applied to the correlation detector during the calibration mode.

BRIEF DESCRIPTION OF THE DRAWING

The single FIGURE is a schematic block diagram of an AGC calibration loop in accordance with the present invention.

DETAILED DESCRIPTION

Referring to the FIGURE, depicting an embodiment of the AGC calibration loop in accordance with the present invention, a spread-spectrum input signal is applied to a multiplier 11 which multiplies the spread-spectrum input by a pseudo noise (PN) sequence generated by PN sequence generator 13. Multiplier 11 may comprise a suitable double-balanced mixer, the output of which is coupled through wideband bandpass filter 10 and amplified by an AGC amplifier 12. The bandwidth of filter 10 is selected to be much wider than the bit rate, so that the signal-to-noise ratio of the input to AGC amplifier 12 is very small and near a prescribed noise floor threshold. The output of AGC amplifier 12 is coupled to detector 8 and to narrow band filter 9. Narrow band filter 9 may have a bandwidth an order of magnitude or more narrower than the bandwidth of wide band filter 10, so as to effectively pass the signal of interest to detector 14. Detector 14 rectifies and detects the envelope of the amplified product of the spread-spectrum input signal and the PN sequence applied to multiplier 11 by PN sequence generator 13.

PN sequence generator 13 may comprise a switchable or controlled sequence generator which normally produces an acquisition mode pseudo noise sequence to be correlated with the pseudo noise sequence contained in a receiver spread-spectrum input signal; in response to a control signal output from control counter 22, PN sequence generator 13 may generate a calibration mode PN sequence which is substantially different from any sequence expected to be contained in an incoming spread-spectrum signal to be acquired. This second or calibration mode PN sequence has a spectrum characteristic approximating that of white noise and is substituted for the acquisition PN sequence during AGC calibration.

Detector 8, which forms part of the AGC control loop, rectifies and detects the envelope of the wide band noise-representative output of AGC amplifier 12 and couples this envelope-detected signal via resistor 28 to amplifier 25, the output of which is fed back to control the amplification of AGC amplifier 12. Amplifier 25 has a feedback capacitor 30, coupled between a negative input and its output. Resistor 27 couples the positive input of amplifier 25 to ground, while the summing junction at the negative input to amplifier 25 is further coupled through a resistor 29 to a variable tap of potentiometer 24, which is connected across a suitable bias voltage source (V). The feedback coupling of the output of detector 8 through amplifier 25 to AGC amplifier 12 provides a standard AGC feedback loop for controlling the gain of amplifier 12. AGC amplifier 12 level-controls the noise so that the noise floor of the correlation detection process is substantially invariable as a function of the input S/N ratio of the correlation detector formed of multiplier 11 and detector 14. Proper setting of the noise floor is established by way of potentiometer 24 and the output of D-A converter 23, respectively coupled to amplifier 25 through resistors 29 and 26, respectively, as will be explained below.

The output of detector 14 is applied to a sample and hold circuit 15, the contents of which are converted from analog into digital form by A-D converter 16. The digital representation of the contents of sample and hold circuit 15 are stored in accumulator 17 (such as twelve bit accumulator), the output of which is coupled to a subtractor 19. Subtractor 19 compares the contents of accumulator 17 with a preset noise floor reference voltage value stored in register 18 and supplies a corrected or adjusted noise floor value to a long (on the order of fifteen bits, e.g.) accumulator 21. The contents of accumulator 21 represent a noise floor adjustment voltage to be supplied to the feedback loop for AGC amplifier 12, to correct for factors such as gain variations introduced by the correlation detector components, drift in the noise floor reference, etc. The operation of accumulator 21 is controlled by control counter 22 which counts clock pulses generated by clock circuit 20 in response to a start calibration input. Clock circuit 20 is also coupled to each of accumulators 17 and 21 to update their contents at each clock pulse. The contents of accumulator 21 are converted into an analog voltage by D-A converter 23 and this noise floor deviation representative analog voltage is coupled via resistor 26 to the summing junction at the negative input terminal of feedback amplifier 25. Accumulator 21 is enabled by control counter 22 as long as control counter 22 continues to count clock pulses from clock circuit 20, once the calibration sequence has been initiated by a resetting start calibration input signal. Control counter 22 is also connected to PN sequence generator 13 to control the mode of operation and thereby the PN sequence supplied by generator 13 to multiplier 11. During the calibration mode, as control counter 22 is counting clock pulses from clock 20, it supplies a control signal to generator 13 so that the output of generator 13 is the above-described calibration mode PN sequence. Upon control counter 22 reaching an established pulse count, counter 22 disables accumulator 21, so that it retains its present contents without further updating, and counter 22 also supplies a control signal to PN sequence generator 13, causing generator 13 to begin supplying an acquisition mode PN sequence to multiplier 11 in place of the calibration mode noise sequence.

OPERATION

Prior to placing the AGC calibration loop into operation, a pre-established noise floor reference voltage may be loaded into reference register 18. This reference voltage may be derived from calculated system design criteria and represents the expected value at the output of AGC amplifier when its gain is unity and the detector is correlating white noise. In addition, the tap of potentiometer 24 is adjusted so that the detector output of detector 14, corresponding to the rectified output of amplifier 12, is equal to the preestablished noise floor reference. For this purpose, PN sequence generator 13 may be briefly switched (by a control separate from the output of control counter 22, not shown) to supply a calibration mode PN sequence to mulitiplier 11, and the output of detector 14 is measured separately while the tap of potentiometer 24 is adjusted until the analog voltage output of detector 14 equals the voltage value represented by the contents of register 18. Potentiometer 24 may have a voltage output range considerably greater than the range over which the noise floor may be adjusted, so that the output of subtractor 19, in effect, constitutes a calibration mode controlled vernier for the tap setting of potentiometer 24.

Upon the application of a START CALIBRATION or enable signal to control counter 22 from a suitable switch (not shown), accumulator 21, which, like accumulator 17, had been previously cleared or reset, becomes enabled. Also, control counter 22 causes PN sequence generator 13 to supply a calibration mode or white noise representative PN sequence to multiplier 11. The product of the receiver input and the white noise representative sequence applied to multiplier 11 is coupled through wideband bandpass filter 10 and amplified in AGC amplifier 12 and the envelope of the rectified product is detected by detector 8. The output of AGC amplifier 12 is also coupled via narrow band filter 9 to detector 14, so that a detected representation of the signal of interest may be temporarily stored in sample and hold circuit 15, to be used for adjusting a noise floor deviation voltage. The output of detector 8 is coupled through resistor 28 to amplifier 25 and is summed with the voltage preset by adjusting the tap of potentiometer 24, as described above, and a variable accumulated noise floor deviation voltage supplied via resistor 26 from D-A converter 23 and accumulator 21; thus, AGC amplifier 12 will be controlled by the output of detector 8 relative to a noise floor voltage defined by the sum of the output of potentiometer 24 and the contents of accumulator 21.

Now, as the output of detector 14 is sampled and stored in sample and hold circuit 15, it is converted into digital format by A-D converter 16 and supplied to accumulator 17. A summation of samples, on the order of sixteen samples, is supplied from accumulator 17 to subtractor 19 wherein it is compared with the pre-established noise floor voltage stored in register 18 and any difference therebetween is stored in accumulator 21. In the absence of a change in expected detector and gain control parameters, then, for a white noise input, the output of detector 14 should be equal to the value stored in register 18, whereby the difference between the inputs to subtractor 19 will be zero, so that zero is stored in accumulator 21, and the output of D-A converter 23 is zero. As a result, the noise floor is effectively the setting of the tap of potentiometer 24. However, any change in system parameters which effectively shifts the noise floor reference will cause the output of subtractor 19 to differ from zero and this deviation is supplied to accumulator 21. D-A converter 23 now adds to the voltage represented by the tap setting of potentiometer 24 a value other than zero, so that the gain of AGC amplifier 12 will be adjusted to the proper value based upon the corrected noise floor. In the absence of any further change in the system, the corrected noise floor will cause the output of detector 14 to be adjusted to a value whereby the output of subtraetor 19 again becomes zero, the contents of accumulator 21 being uneffected. For a further change in system gain or parameter drift, causing the output of subtractor 19 to be non-zero, a new correction value (positive or negative) will be supplied to accumulator 21 to adjust the reference noise floor. This operation continues, until a prescribed number of detector output samples, corresponding to a pre-established clock count of counter 22, has been processed, whereupon control counter 22 reaches its pre-established count (its preset capacity defining the calibration mode time interval), and the enable signal previously applied from counter 22 to accumulator 21 is terminated. The contents of accumulator 21 at this time will be used as the calibrated noise floor reference voltage to be applied as a gain control reference for amplifier 25 for spread-spectrum signal acquisition during sequential detection. PN sequence generator 13 also switches to its acquisition mode of operation and begins supplying the acquisition mode PN sequence to multiplier 11. The outer or second AGC calibration loop is no longer updated; still, the result of its noise floor calibration operation during the calibration mode described above is retained to be used as the gain control reference for ensuring accurate signal acquisition during the sequential detection process.

The length of the calibration interval or number of samples (established by the number of clock pulses from clock generator 20) which are processed to adjust the noise floor reference to be used for spread-spectrum signal acquisition will depend upon the final error desired (e.g. how close to a pre-established value the final loop gain is to be), so that the number of samples or length of the calibration interval may vary as design criteria demand. Depending upon calculated parameters and operational design, a calibration interval covering several thousand samples may reduce precalibration S/N error to less than a tenth of a dB.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. In a receiver system having an automatic gain control feedback loop for controlling the gain of a received signal amplifier, a system for calibrating the operation of said gain control feedback loop comprising:

first means for monitoring the output of said received signal amplifier during receiver operation in the presence of a prescribed noise input; and second means, coupled to said first means and to said received signal amplifier, for comparing the monitored output of said received signal amplifier with a prescribed reference that is independent of the contents of the output of said received signal amplifer and adjusting the operation of said feedback loop in accordance with the deviation of said monitored output relative to said reference, and wherein said second means includes means for accumulating the deviation of said monitored output relative to said reference for a prescribed interval of time and adjusting the operation of said feedback loop in accordance with the accumulated deviation.

2. A system according to claim 1, wherein said prescribed reference corresponds to a reference noise level relative to which the gain of said amplifier is controlled.

3. A system according to claim 2, wherein said first means includes means for combining a received input signal with said prescribed noise input and generating an output signal as representative of a detected noise level and wherein said second means includes means for generating a noise reference deviation signal as a function of the difference between the detected noise level representative output signal and said reference noise level and controlling the operation of said feedback loop in accordance with said noise reference deviation signal.

4. A system according to claim 3, wherein said feedback loop includes means for generating an amplifier gain control signal as a function of the detected noise level and said noise reference deviation signal, and for controlling the gain of said amplifier in accordance with said generated amplifier gain control signal.

5. A system according to claim 3, wherein said second means includes means for accumulating sequential values of said noise reference deviation signal over a prescribed interval of time and controlling the operation of said feedback loop in accordance with the accumulated sequential values of said noise reference deviation signal.

6. A system according to claim 5, wherein said second means includes means for causing said first means to combine a received input signal with said prescribed noise input only for said prescribed interval of time.

7. A system according to claim 6, wherein said first means further includes means for selectively combining a received input signal with a prescribed reference signal representative of a transmitted information signal, and said second means includes means for causing said first means to combine a received input signal with said prescribed reference signal subsequent to the termination of said prescribed interval of time and for supplying to said amplifier gain control signal generating means a noise reference deviation signal corresponding to the total of the sequential values of said noise reference deviation signal which have been accumulated over said prescribed interval of time.

8. In a receiver system having an automatic gain control feedback loop for controlling the gain of a received signal amplifier, a method for calibrating the operation of said control feedback loop comprising the steps of:

monitoring the output of said received signal amplifier during receiver operation in the presence of a prescribed noise input; and comparing the monitored output of said received signal amplifier with a prescribed reference that is independent of the contents of the output of said received signal amplifier and adjusting the operation of said feedback loop in accordance with the deviation of said monitored output relative to said reference, and wherein said adjusting step includes accumulating the deviation of said monitored output relative to said reference for a prescribed interval of time and adjusting the operation of said feedback loop in accordance with the accumulated deviation.

9. A method according to claim 8, wherein said prescribed reference corresponds to a reference noise level relative to which the gain of said amplifier is controlled.

10. A method according to claim 9, wherein said monitoring step includes the steps of combining a received input signal with said prescribed noise input and generating an output signal as representative of a detected noise level and wherein said adjusting step includes the steps of generating a noise reference deviation signal as a function of the difference between the detected noise level representative output signal and said reference noise level and controlling the operation of said feedback loop in accordance with said noise reference deviation signal.

11. A method according to claim 10, further including the step of causing said feedback loop to generate an amplifier gain control signal as a function of a detected noise level and said noise reference deviation signal, and controlling the gain of said amplifier in accordance with said generated amplifier gain control signal.

12. A method according to claim 10, wherein said adjusting step further includes the steps of accumulating sequential values of said noise reference deviation signal over a prescribed interval of time and controlling the operation of said feedback loop in accordance with the accumulated sequential values of said noise reference deviation signal.

13. A method according to claim 12, wherein said adjusting step further includes the step of causing a received input signal to be combined with said prescribed noise input only for said prescribed interval of time.

14. A method according to claim 13, wherein said monitoring step further includes selectively combining a received input signal with a prescribed reference signal representative of a transmitted information signal, and said adjusting step further includes the steps of causing a received input signal to be combined with said prescribed reference signal subsequent to the termination of said prescribed interval of time and supplying to said feedback loop a noise reference deviation signal corresponding to the total of the sequential values of said noise reference deviation signal which have been accumulated over said prescribed interval of time.

15. In a receiver system having an automatic gain control feedback loop for controlling the gain of a received signal amplifier through which received input signals are coupled, an arrangement for calibrating the operation of said gain control feedback loop comprising:
  first means for selectively coupling a first prescribed noise signal to said received signal amplifier during a prescribed interval of time and generating an output signal in accordance with the difference between a detected noise level obtained from said amplifier and a prescribed noise reference level, said output signal being coupled to said received signal amplifier to adjust the gain thereof to reduce said difference to zero; and
  second means, responsive to the termination of said prescribed interval of time, for thereafter selectively coupling a second prescribed noise signal, different from said first prescribed noise signal, together with a received input signal through said received signal amplifier and for causing the gain of said received signal amplifier to be controlled in accordance with an accumulated value of said output signal over said prescribed interval of time.

16. An arrangement according to claim 15, wherein said first means includes means for accumulating sequential values of said output signal over said prescribed interval of time and adjusting the gain of said received signal amplifier in accordance with the accumulated sequential values of said output signal.

17. An arrangement according to claim 16, further comprising means, coupled to the output of said received signal amplifier, for generating an amplifier gain control signal as a function of the detected noise level and said accumulated output signal, and coupling said amplifier gain control signal to said received signal amplifier to control the gain thereof.

18. An arrangement according to claim 17, wherein said first and second prescribed noise signals constitute first and second respectively different pseudo random noise sequences.

19. In a receiver system having an automatic gain control feedback loop for controlling the gain of a received signal amplifier through which received input signals are coupled, a method for controlling the operation of said gain control feedback loop comprising the steps of:
  during a prescribed interval of time representative of a calibration interval, selectively coupling a first prescribed noise signal through said received signal amplifier and generating an output signal in accordance with the difference between a detected noise level obtained from said amplifier and a prescribed noise reference level, and further adjusting the gain of said received signal amplifier in accordance with said output signal; and
  upon the termination of said calibration interval, thereafter after selectively coupling a second prescribed noise signal, different from said first prescribed noise signal, together with a received input signal through said received signal amplifier and causing the gain of said received signal amplifier to be controlled in accordance with an accumulated value of said output signal over said calibration interval.

20. A method according to claim 19, wherein said adjusting step includes the steps of accumulating sequential values of said output signal over said caibration interval and adjusting the gain of said received signal amplifier in accordance with the accumulated sequential values of said output signal.

21. A method according to claim 20, further comprising the step of generating an amplifier gain control signal as a function of the detected noise level and said accumulated output signal, and coupling said amplifier gain control signal to said received signal amplifier to control the gain thereof.

22. A method according to claim 21, wherein said first and second prescribed noise signals constitute first and second respectively different pseudo random noise sequences.

* * * * *